United States Patent
Heidlas et al.

(10) Patent No.: US 12,286,586 B2
(45) Date of Patent: Apr. 29, 2025

(54) HYDROCARBON SWELLING PARTICLES FOR WELLBORE CEMENTING

(71) Applicant: OMNOVA Solutions Inc., Beachwood, OH (US)

(72) Inventors: Juergen Heidlas, Houston, TX (US); Bertrand Guichard, Villecresnes (FR); Patrick Vongphoutone, Bussy Saint Georges (FR); Douglas J. Harrison, Stafford, TX (US); AJ Marino, Stafford, TX (US)

(73) Assignee: SYNTHOMER INC., Beachwood, OH (US)

( * ) Notice: Subject to any disclaimer, the term of this patent is extended or adjusted under 35 U.S.C. 154(b) by 153 days.

(21) Appl. No.: 17/618,540

(22) PCT Filed: Jun. 12, 2020

(86) PCT No.: PCT/US2020/037356
§ 371 (c)(1),
(2) Date: Dec. 13, 2021

(87) PCT Pub. No.: WO2020/252221
PCT Pub. Date: Dec. 17, 2020

(65) Prior Publication Data
US 2022/0363973 A1    Nov. 17, 2022

Related U.S. Application Data

(60) Provisional application No. 62/860,822, filed on Jun. 13, 2019.

(51) Int. Cl.
| | | |
|---|---|---|
| C08F 212/12 | (2006.01) |
| C04B 24/26 | (2006.01) |
| C04B 28/02 | (2006.01) |
| C08F 212/14 | (2006.01) |
| C08F 220/18 | (2006.01) |
| C09K 8/493 | (2006.01) |
| E21B 33/14 | (2006.01) |
| C04B 103/00 | (2006.01) |
| C04B 103/40 | (2006.01) |
| C08F 212/32 | (2006.01) |

(52) U.S. Cl.
CPC .......... *C09K 8/493* (2013.01); *C04B 24/2647* (2013.01); *C04B 24/2676* (2013.01); *C04B 24/2688* (2013.01); *C04B 28/02* (2013.01); *C08F 212/12* (2013.01); *C08F 220/1804* (2020.02); *E21B 33/14* (2013.01); *C04B 2103/0052* (2013.01); *C04B 2103/408* (2013.01); *C08F 212/14* (2013.01); *C08F 212/32* (2013.01); *C08F 220/1808* (2020.02); *C08F 2800/20* (2013.01); *C08F 2810/20* (2013.01)

(58) Field of Classification Search
None
See application file for complete search history.

(56) References Cited

U.S. PATENT DOCUMENTS

| | | | | |
|---|---|---|---|---|
| 4,432,968 | A * | 2/1984 | Page | A23K 20/10 424/501 |
| 4,758,492 | A * | 7/1988 | Nair | G03G 5/142 526/287 |
| 11,041,107 | B2 * | 6/2021 | Mazard | C08F 212/12 |
| 2017/0210895 | A1 * | 7/2017 | Centner | C08F 2/30 |
| 2017/0306212 | A1 * | 10/2017 | Le Roy-Delage | C04B 28/02 |

OTHER PUBLICATIONS

Kobayashi, M. et al. "Ionic Crosslinked Acrylic Elastomers Synthesized by One-Pot Method Using Ionic Crosslinking Agent, Part 3. The Effects of Copolymerization Compositions for Physical and Dynamic Mechanical Properties of Ionic Crosslinked Acrylic . . . ". Nippon Gomu Kyokaishi 2001, 74(12), 496-501. (Year: 2001).*

* cited by examiner

*Primary Examiner* — Richard A. Huhn
(74) *Attorney, Agent, or Firm* — Lippes Mathias LLP

(57) ABSTRACT

Hydrocarbon swelling particles for wellbore cementing include a crosslinked polymer comprising vinyl aromatic monomer and/or (meth)acrylic monomer.

12 Claims, No Drawings

HYDROCARBON SWELLING PARTICLES FOR WELLBORE CEMENTING

This application is a National Stage Entry of International Application No. PCT/US2020/037356, filed Jun. 12, 2020, which claims priority to U.S. Provisional Application Ser. No. 62/860,822, filed Jun. 13, 2019. The contents of both of these applications are incorporated by reference herein in their entireties.

BACKGROUND

The present disclosure relates to hydrocarbon swelling particles. The particles find particular application in conjunction with wellbore cementing and will be described with particular reference thereto. However, it is to be appreciated that the particles and cementing compositions are also amenable to other like applications.

During the construction of subterranean wells, it is common practice, during and after drilling, to place a liner or casing secured by cement pumped into the annulus around the outside of the liner. The cement serves to support the liner and to provide isolation of the various fluid-producing zones through which the well passes, so-called "zonal isolation." This latter function is important because it prevents fluids from different layers contaminating each other. For example, the cement prevents formation fluids and gases from entering the water table and polluting drinking water and prevents water from passing into the wellbore instead of the desired oil or gas. In order to fulfill this function, it is necessary for the cement to be present as an impermeable continuous sheath. However, over time this sheath can deteriorate and become permeable by defects (i.e., by the occurrence of microannuli, fissures, and/or cracks). The deterioration can be due to physical stresses caused by tectonic movements, temperature effects, chemical degradation of the cement, or various other reasons.

Proposals for dealing with the problems of deterioration of the cement sheath over time include the addition of additives to the cement composition materials in order to improve the physical properties of the set cement. Examples of additives include amorphous metal fibers, which are added to the cement slurry to improve strength and resistance to impact damage; and flexible materials (rubber or polymers), which are added to confer a degree of flexibility on the cement sheath.

The term "self-healing" or "self-repairing" cement is used if a cement additive is capable of closing a defect in the set cement sheath upon contact with a subterranean medium, like water or hydrocarbons. Tittelboom et al. compiled and compared the different options for self-healing in cementitious materials (Materials 2013, 6, 2182-2217). A frequently used approach is use of polymer-modified cement, i.e., adding a polymeric additive to the cement which is placed downhole.

For example, US Pat. App. Pub. No. 2007/0204765, the disclosure of which is herein incorporated by reference, discloses encapsulated super-absorbent polymers which swell in contact with water. The main disadvantage of using water-soluble polymers, however, is that their swelling is reversible. Also, there is a risk that the cement rheology is negatively affected (i.e., it becomes too viscous) if the encapsulated polymers are prematurely released during pumping, particularly at higher well temperatures.

Swelling of lipophilic polymers is relatively easy to accomplish in contact with crude oil because of its polar nature compared to the lower hydrocarbon liquids and gases. U.S. Pat. No. 9,683,161, the disclosure of which is hereby incorporated by reference, discloses using thermoplastic block-copolymers as swelling additives in wellbore cement being in contact with natural gas, i.e., supercritical methane. Based on the large particle size (between 100 and 900 μm), a very high polymer dosage (10 to 55% by volume of slurry solids) is required. This dosage negatively impacts the rheology of the cement when pumped and the strength of the set cement. The tests show that high pressures, exceeding 1,500 psi (10.34 MPa), are required to induce swelling and consequently accomplish an effective sealing effect. In most wells however the gas pressure is much lower, particularly in the upper wellbore region, where the sealing of the cement is most desired to prevent gas emission to the environment.

Of significant interest are well cementing systems that can be placed by pumping downhole in the normal manner and that contain lipophilic polymers which allow the cement sheath to remediate defects when contacted with hydrocarbons associated with natural gas, even under lower pressure conditions.

Compositions for wellbore cementing which are capable of achieving some or all of the aforementioned characteristics are of significant commercial interest.

BRIEF DESCRIPTION

The present disclosure relates to hydrocarbon swelling particles for wellbore cementing compositions. The particles may be swellable in lower hydrocarbons (also known as natural gas liquids or NGL) such as propane, butane, pentane, hexane, etc., which are components in wet and associated natural gas. The compositions include a crosslinked vinyl aromatic/acrylic copolymer.

According to one embodiment, a wellbore cementing composition is provided. The composition includes a cement powder and hydrocarbon swelling particles containing a crosslinked polymer including vinyl aromatic monomer and (meth)acrylic monomer.

According to a further embodiment, a method for producing a cementitious wellbore sheath is provided. The method includes pumping a slurry into a wellbore. The slurry comprises cement, water, and hydrocarbon swelling particles in the form of a crosslinked polymer including vinyl aromatic monomer and/or (meth)acrylic monomer.

According to an additional embodiment, a method for producing a cementitious wellbore sheath is provided. The method comprises pumping a slurry into a wellbore. The slurry includes cement and a liquid form latex containing particles of a crosslinked polymer including vinyl aromatic monomer and/or (meth)acrylic monomer.

According to another embodiment, a partially crosslinked polymer comprising a vinyl aromatic monomer and a methacrylate monomer with a plurality of methyl end groups is provided.

These and other non-limiting characteristics of the disclosure are more particularly disclosed below.

DETAILED DESCRIPTION

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there-between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the term "hydrogen swelling particles" refers to particles that are swellable in hydrocarbons (e.g., lower hydrocarbons such as propane, butane, pentane, hexane, etc.).

As used herein, the term "Critical Swelling Temperature" or "CST" refers to the temperature above which hydrocarbon-swelling particles start swelling when in contact with hydrocarbons. The CST is typically lower than the formation temperature.

As used herein, the term "BWOC" means by weight of the cement on a dry basis.

A polymer may be described as comprising various monomers. As a person having ordinary skill in the art would understand, this means that the polymer results from the polymerization of these monomers. For example, polyethylene results from the polymerization of ethylene monomer ($CH_2$=$CH_2$). A polymer described herein as comprising ethylene monomer contains repeating ethylene mer (—$CH_2CH_2$—) units. Put another way, the mer units result from the incorporation of the monomer into the polymer.

The present disclosure relates to hydrocarbon swelling particles for wellbore cementing. The particles are swellable in at least one lower hydrocarbon such as propane, butane, pentane, hexane, etc.

The particles contain a crosslinked polymeric component from the copolymerization of at least one vinyl aromatic monomer and/or at least one (meth)acrylic monomer.

The crosslinked polymers that are used as a gas-swelling, sealing additive in the wellbore cementing composition may be made by emulsion polymerization.

The polymers may be formed from monomers selected from styrene, substituted styrene, alkyl acrylate, substituted alkyl acrylate, alkyl methacrylate, substituted alkyl methacrylate, and combinations thereof. Functionalized versions of these monomers may also be used. Some representative, non-limiting examples of the selective monomers, which can be used, include styrene, alpha-methylstyrene, para-methylstyrene (PMS), para-tert-butylstyrene (PTBS), vinyltoluene, (M)ethyl(meth)acrylate, 2-ethylhexyl(meth)acrylate, butyl(meth)acrylate, cyclohexyl(Me)acrylate, isobornyl(Me)acrylate, isobutyl(Me)acrylate, p-tert-butyl-cyclohexyl(Me)acrylate, butadiene, isoprene, ethylene, VeoVa (vinyl esters of neodecanoic acids), and combinations thereof.

In some embodiments, these crosslinked polymers include a copolymer of at least one vinyl aromatic monomer and/or at least one (meth)acrylic monomer. A small amount of at least one crosslinking agent, such as divinyl benzene or ethylene glycol dimethacrylate, may also be included.

Non-limiting examples of the vinyl aromatic monomer contain from about 8 to about 20 carbon atoms, including from about 8 to about 14 carbon atoms. Specific examples of vinyl aromatic monomers include styrene, α-methylstyrene, 1-vinyl naphthalene, 2-vinyl naphthalene, 3-methyl styrene, 4-methyl styrene, 4-propyl styrene, t-butyl styrene, 4-cyclohexyl styrene, 4-dodecyl styrene, 2-ethyl-4-benzyl styrene, 4-(phenylbutyl) styrene, divinylbenzene, 4-tert-butylstyrene, and combinations of any two or more thereof. In particular embodiments, the vinyl aromatic monomer includes styrene, 4-methyl styrene, and/or 4-vinylstyrene.

The acrylic/acrylate monomer may be an alkyl acrylate monomer and/or an alkyl methacrylate monomer and/or a salt of acrylic acid. The alkyl acrylate monomer may be of the structural formula:

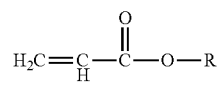

wherein R represents an alkyl group containing from 1 to about 10 carbon atoms, including from 2 to about 8 carbon atoms and about 4 carbon atoms. Non-limiting examples include ethyl acrylate, propyl acrylate, butyl acrylate, pentyl acrylate, hexyl acrylate, and 2-ethyl hexyl acrylate. The alkyl groups in the alkyl acrylate monomers can be straight-chained or branched. For example, n-propyl acrylate and/or isopropyl acrylate may be employed. Similarly, n-butyl acrylate and/or tertiary-butyl acrylate can be employed.

The alkyl methacrylate monomers may contain from 1 to about 20 carbon atoms, including from about 2 to about 12 carbon atoms. Non-limiting examples of alkyl methacrylate monomers include methyl methacrylate, butyl methacrylate, 2-ethylhexyl methacrylate, lauryl methacrylate, isobutyl methacrylate (IBMA), tert-butyl methacrylate (TBMA), isobornyl methacrylate, and combinations of any two or more thereof.

In some embodiments, the polymerization is an emulsion polymerization. The emulsion polymerization may be via a batch, continuous, or semi-continuous process. In some embodiments, the monomers and the water phase are loaded into a reactor and mixed prior to initiating polymerization (e.g., with a radical initiator). In some embodiments, the initial reaction temperature is in the range of from about 40° C. to about 50° C. The temperature may be increased (e.g., up to about 60° C.) to ensure a complete reaction of the monomers.

In some embodiments, the glass transition temperature ($T_g$) of the polymer is in the range of from about 40° C. to about 120° C. Below about 75° C., the polymer can be dried by syneresis. Above about 75° C., spray-drying may be employed.

The polymer may be partially cross-linked. The partially cross-linked polymer may be obtained by a semi-continuous process condition which promotes the swelling properties of the polymer particles in hydrocarbons. In some embodiments, the cross-linking agent is present at a concentration in the range of from about 0.1 to about 5% by weight of the polymer. The cross-linking may be more prominent in the core if the cross-linker concentration is higher at the start of the reaction.

The monomer units may be randomly distributed along the polymer chains.

In some embodiments, the polymer particles have a core-shell structure. The core of the particles may have a lower $T_g$ than the shell of the particles. This relationship may prevent particle agglomeration and aid in obtaining a free-flowing powder.

The core-shell particles may include a soft core encapsulated within a hard shell. The shell polymer(s) may have a $T_g$ of at least 0° C., including at least about 20° C., at least about 40° C., at least about 60° C., at least about 80° C., at least about 90° C., and at least about 95° C. The core polymer(s) may have a $T_g$ of at most about 20° C., including at most about 0° C., at most about −10° C., at most about −20° C., at most about −30° C., at most about −40° C., and at most about −50° C. In some embodiments, the difference between the glass transition temperatures of the shell and core polymers is in the range of about 20° C. to about 200° C., including about 50° C. to about 175° C., about 100° C. to about 160° C., and about 140° C. to about 155° C.

In some embodiments, the soft core comprises a copolymer of styrene and butadiene and the hard shell comprises a polystyrene. In other embodiments, the core comprises polyisobutylene.

The polymer composition may be in the form of solid particles (powder).

After drying (e.g., spray-drying or syneresis), the particle size distribution may be adjusted by grinding and sieving. In some embodiments, the particle size range is between about 20 μm and about 1,000 μm. The $D_{50}$ (diameter at which 50% of the sample's mass contains smaller particles) may be in the range of about 50 μm to about 300 μm.

The polymers can also be used in liquid form (latex) with a particle size in the range of about 50 nm to about 300 nm, including about 80 nm to about 200 nm.

The particles may be in the form of spherical or substantially spherical particles.

In some embodiments, the particles are insoluble in water but swell in oil/hydrocarbons. Activation of the particles may occur based on hydrophobicity and/or temperature.

The activated particles may increase significantly in size in at least one $C_3$-$C_6$ hydrocarbon. Examples of such hydrocarbons include propane, butane, pentane, and hexane. In some embodiments, the diameter increase is at least two times, including at least three times, at least four times, at least five times, at least six times, at least seven times, at least eight times, at least nine times, and at least ten times. In some embodiments, the volume increase is at least two times, including at least three times, at least four times, at least five times, at least six times, at least seven times, at least eight times, at least nine times, and at least ten times.

The time, temperature, pressure, and general conditions of the size change measurement may be as described in one or more of the examples.

The swollen particles are deformable to efficiently plug and seal micro-cracks and fissures in a cement sheath within a wellbore. The swelling particles can harden when the space available for swelling is constrained (e.g., in micro-annulus, pores or micro-fissures) to thereby provide a plugging mechanism.

The individual latex particles may swell from a "dry" size/diameter of about 100 nm to a swollen size/diameter close to 1 μm.

It should be understood that activation of the particles depends on the composition of the particles, the composition of the hydrocarbon, and temperature. The particles may be activated when the temperature exceeds the Critical Swelling Temperature.

The powder particles may be dry blended with other solid components of a cement mixture before or after transport to a well site.

The liquid polymer composition (latex) may be added to the cement slurry mixing process. The addition can be performed in a batch mode or a continuous mode.

The dosage of the polymer composition depends on the requirements of the specific application. In some embodiments, the polymer composition is included in an amount of from about 3% to about 30% BWOC, including from about 6% to about 25% BWOC, and from about 10% to about 20% BWOC.

In some embodiments, the cement mixture further includes other additives, like dispersants, for adjusting the rheology. Non-limiting examples of dispersants include polynaphthalene sulfonates (PNS), acetone formaldehyde sulfite condensate (AFS), and polycarboxylates.

Additional cementing additives may be included in the cement compositions of the present disclosure. Non-limiting examples of additives include defoamers, accelerators, retarders, fluid loss agents, suspension aids, gas migration additives, latexes, and weighting agents.

The hydrocarbon-swelling particles of the present disclosure may be included in a cementitious sheathing within a wellbore. The sheathing may be self-repairing. The self-repairing may be intrinsic, capsule-based, or vascular. Intrinsic self-repairing materials exhibit self-repairing properties due to the composition of the cementitious matrix.

Sealing the cement sheath advantageously reduces hydrocarbon emissions into the atmosphere and reduces the migration of hydrocarbons into more permeable formation layers which could contaminate ground water reservoirs.

The wellbore may be formed in a formation containing a hydrocarbon composition with less than 90 mol % methane, including less than 80 mol % methane, less than 75 mol % methane, less than 70 mol % methane, less than 65 mol % methane, and less than 60 mol % methane.

In some embodiments, the wellbore is formed in a formation containing a hydrocarbon composition with at least 5 mol % $C_2$-$C_6$ alkanes including at least 10 mol % $C_2$-$C_6$ alkanes, at least 15 mol % $C_2$-$C_6$ alkanes, at least 18 mol % $C_2$-$C_6$ alkanes, at least 20 mol % $C_2$-$C_6$ alkanes, at least 25 mol % $C_2$-$C_6$ alkanes, at least 30 mol % $C_2$-$C_6$ alkanes, and at least 32 mol % $C_2$-$C_6$ alkanes.

The wellbore may be formed in a formation containing a hydrocarbon composition with at least 1 mol % propane, including at least 2 mol % propane, at least 3 mol % propane, at least 4 mol % propane, at least 5 mol % propane, at least 6 mol % propane, at least 7 mol % propane, at least 8 mol % propane, and at least 9 mol % propane.

The table below includes example compositions of crude oil, associated gas, wet gas, and dry gas, wherein the numbers are mol %. In some embodiments, the particles of the present disclosure swell in associated gas and/or wet gas. The wellbore cementing compositions of the present disclosure may be pumped to form a wellbore in a reservoir known to contain associated gas and/or wet gas. It should be understood that the relative amounts of the alkanes in the table are merely representative, and that the terms "associated gas" and "wet gas" as used herein include ranges of ±15% of these relative amounts. The ±15% is relative. For example, 10 mol %±15% in this context refers to 8.5 mol % to 11.5 mol %, not 0 mol % to 30 mol %.

| Component | Symbol | Crude Oil | Associated Gas | Wet Gas | Dry Gas |
|---|---|---|---|---|---|
| Methane | $C_1$ | 37.54 | 67.32 | 59.52 | 97.17 |
| Ethane | $C_2$ | 9.67 | 17.66 | 5.36 | 1.89 |
| Propane | $C_3$ | 6.95 | 8.95 | 4.71 | 0.29 |
| i-Butane | i-$C_4$ | 1.44 | 1.29 | 2.03 | 0.13 |
| n-Butane | n-$C_4$ | 3.93 | 2.91 | 2.39 | 0.12 |
| i-Pentane | i-$C_5$ | 1.44 | 0.53 | 1.80 | 0.07 |
| n-Pentane | n-$C_5$ | 1.41 | 0.41 | 1.81 | 0.05 |
| Hexane | $C_6$ | 4.33 | 0.44 | 2.60 | 0.04 |
| Heptanes Plus | $C_{7+}$ | 33.29 | 0.49 | 19.98 | 0.24 |

In some embodiments, the polymer comprises an aromatic monomer (e.g., a vinyl aromatic monomer) and a methacrylate monomer with a plurality of methyl end groups. The polymer may further include a glass transition temperature adjusting monomer for altering the glass transition temperature of the polymer.

The vinyl aromatic monomer may constitute from about 10 mol % to about 90 mol %, including from about 20 mol % to about 80 mol %, about 40 mol % to about 60 mol %, about 45 mol % to about 55 mol %, about 70 mol % to about 90 mol %, about 75 mol % to about 85 mol %, and about 50 mol % to about 80 mol % of the total monomer.

The vinyl aromatic monomer may be selected from para-tert-butylstyrene, 4-tert-butoxystyrene, 4-benzhydrylstyrene, 9-vinylanthracene, 4-vinylbiphenyl, and a combination of any two or more thereof.

The (meth)acrylate monomer may constitute from about 10 mol % to about 90 mol %, including from about 20 mol % to about 80 mol %, about 40 mol % to about 60 mol %, about 45 mol % to about 55 mol %, about 70 mol % to about 90 mol %, about 75 mol % to about 85 mol %, and about 30 mol % to about 80 mol % of the total monomer.

The methacrylate monomer may be selected from isobutyl methacrylate, tert-butyl methacrylate, and a combination thereof.

The glass transition temperature adjusting monomer may be included in an amount of from about 0 mol % to about 50 mol %, including from about 5 mol % to about 30 mol %.

The glass transition temperature adjusting monomer may be selected from 2-ethylhexyl acrylate, butyl acrylate, butadiene, and a combination of any two or more thereof.

In some embodiments, the polymer has a glass transition temperature in the range of from about 40° C. to about 80° C.

The following examples are provided to illustrate the devices and methods of the present disclosure. The examples are merely illustrative and are not intended to limit the disclosure to the materials, conditions, or process parameters set forth therein.

EXAMPLES

Materials

The following Table summarizes the compositions of the additives discussed in the Examples.

| | physical state | PTBS | 2-EHA | TBMA |
|---|---|---|---|---|
| Example 1 | solid | | PROPRIETARY | |
| Example 2 | solid | | | |
| Example 3 | solid | | | |
| Example 4 | solid | | | |
| Example 5 | solid | | | |
| Example 6 | solid | | | |
| Example 7 | solid | | | |
| Example 8 | solid | | | |
| Example 9 | solid | | | |
| Example 10 | solid | | | |
| Example 11 | solid | 80 | 20 | |
| Example 12 | solid | 50 | 20 | 30 |
| Example 13 | solid | | 20 | 80 |
| Example 14 | solid | | Core-shell | |

The core-shell structure of Example 14 included 80% by weight of soft core (styrene-butadiene copolymer, $T_g \approx 53°$ C.) and 20% by weight of hard shell (polystyrene, $T_g \approx 95°$ C.). The shell may make up between about 5 to about 30% by weight, preferably between about 10 to about 20% by weight, of the polymer. The shell may aid in the composition being a free-flowing, non-sticky powder of the polymer.

Example 9 in Liquid Butane

Most oil and gas wells obtain some form of natural gas liquids including ethane, pentane, butane, and propane. The gas liquids are called "condensates." This test was conducted at 50 psi (0.34 MPa) and 30° C. to determine whether the condensate (i.e., liquid butane) is capable of swelling the polymer (rather than methane itself). 50 psi (0.34 MPa) is a relatively low pressure (probably below common well conditions). At 50 psi (0.34 MPa)/30° C., the density of the liquid butane is about 0.55 g/mL (significantly higher than supercritical methane). Immediately upon contact with liquid butane, Example 9 started to swell. After 1 hour, the polymer powder "soaked up" the butane (like a sponge) and no liquid butane phase was visible anymore. After depressurizing the autoclave, the polymer was completely sintered to a sticky, gummy mass (which was difficult to remove from the autoclave). The results suggest Example 9 as a potential cement sealant for reducing the emission of gas from wellbores.

Pre-Screening in n-Hexane

Additives were pre-screened in n-hexane. Example 9 and Example 5 exhibited the best solubility n n-hexane, resulting in a highly swollen, weak gel. Example 3 and Example 4 swelled by about 100-200% by volume, forming a more rigid gel structure. Example 14 particles were swelling significantly in size (100-200%) but remained separated (no fusion or sintering to a mass). These five materials were selected for further testing based on the pre-screening results.

Tests in Liquid Butane at 65 Psi (0.45 MPa) and 20°-40° C.

The selected materials were tested in liquid butane. The swelling results and appearance of the swollen polymers in liquid butane were very close to the observations in n-hexane. All polymers swelled nicely (in volume) and sintered together, except for Example 14, which only swelled.

Tests in Liquid Propane

The selected materials were tested in liquid propane at 300 psi (2.07 MPa) and 20-40° C. Example 14 neither swelled nor sintered to a mass. The polymer particles of Example 3 and Example 4 were sintered (fused) to a polymer mass but no swelling occurred anymore. Example 4 showed better fusion results than Example 3. A test with Example 4 in propane at 80° C. and 1,050 psi (7.24 MPa) showed the same results as at 40° C. Thus, the lack of swelling does not appear to have been caused due to the CST.

Tests in Supercritical Methane

Neither Example 9 nor Example 5 (the best soluble polymers in hexane) showed any swelling and fusion in methane, even when the tests were run overnight.

Example 11 in Propane (Liquid Propane Up to 50° C.)

The polymer showed fusion and swelled after introduction of the liquid propane. After a 50° C. static hold for 4 hours, the system was vented down to atmospheric pressure. Prior to venting, the pressure was about 150 psi (1.03 MPa). Upon pressure release, the polymer exhibited swelling/foaming. The polymer powder was removed from a pressure autoclave and was brittle. The pressure autoclave had a volume of about 1 liter with a window to observe the behavior of the polymer under pressure.

Example 12 in Propane (Liquid Propane Up to 70° C.)

Liquid propane was introduced to a cell containing Example 12 at room temperature and a static hold was performed for 4 hours at 50° C. Then the temperature was increased, and another static hold was at 70° C. for 4 hours before the autoclave was depressurized to 1 atm. The polymer swelled to fill the entire viewing cell upon venting down, indicating much propane has dissolved into the polymer at 70° C. The highly swollen polymer powder was brittle.

Example 12 in Methane (Up to 70° C.)

Methane was introduced to a bed containing Example 12. The system was maintained in a first static hold at 50° C. for 4 hours and a second static hold at 70° C. for 4 hours. The pressure was released, and the system was vented down to atmospheric pressure. Upon removal, the polymer appeared to be slightly fused together, but not swollen. This effect was probably due to temperature close to glass transition temperature.

Example 13 in Propane Gas (Up to 70° C.)

Propane was introduced to a bed containing Example 13. The powder fused but did not swell after a first static hold at 50° C. for 4 hours and a second static hold at 70° C. for 4 more hours. Upon venting to atmospheric pressure, extreme swelling/foaming and a high amount of propane appeared to be dissolved in the polymer powder. The autoclave was plugged, and no polymer residue could be recovered.

Example 13 in Methane (Up to 70° C.)

Methane was introduced to a bed containing Example 13. No fusion and no swelling were observed. After a first static hold at 50° C. for 4 hours and a second static hold at 70° C. for 4 hours, the system was vented to atmospheric pressure. There was no swelling/foaming upon pressure release, indicating that no methane dissolved in the polymer powder. Some particles appeared to be fused together (hard chips), but not swollen. This probably resulted from the temperature being near the glass transition temperature.

DISCUSSION

The differences in swelling behavior in butane and liquid propane were unexpected. In the liquid state, both gases have about the same density (about 0.5 kg/L). Without wishing to be bound by theory, it is believed that the differences can be partially explained by the increasing hydrogen-carbon ratio of butane and propane (of 2.5 and 2.66, respectively) which changes the polarity. Propane (and to a greater extent ethane and methane) are less polar than butane. It was found that —$CH_3$ (methyl) groups are less polar than =$CH_2$ (methylene) groups. In comparison, the relative polarity from heptane to hexane is reduced by 25% (from 0.012 to 0.009).

At this point, polymers which swell and sinter in liquid butane and only sinter in liquid propane had been identified. Based on the composition of "associated" and "wet" natural gas there are good chances that these polymers will swell and sinter (and eventually plug pores to prevent gas migration through concrete and/or the microannulus), in particular because higher hydrocarbons (e.g., pentane, hexane, heptane) are also present.

PTBS appears to support swelling in hexane and butane (Example 9 and Example 5). Due to the structural similarity of the TB (tertiary butyl) with 3 methyl groups, there is a good chance that these will also swell in propane and lower hydrocarbons.

IBMA (isobutyl methacrylate) has a positive impact on the swelling behavior (compare Example 3 to Example 4 which swells better). This can again be explained by the two methyl groups in the side chain.

2-EHA (2-ethylhexyl acrylate) seems to be neutral on the impact of the swelling behavior: A higher % in Example 3 compared to Example 4 didn't improve swelling.

PMS (p-methyl styrene) didn't contribute to swelling at all (styrene would be even worse). Again, this is explained by the molecular structure (number of methyl groups).

The swelling polymer in lower chain hydrocarbons may have:
  a maximum content of PTBS (>50%)
  a high content of IBMA (>30%);
  2-EHA is neutral; and
  a low amount of PMS (no styrene).

A polymer containing PTBS and IBOMA) was tested in n-hexane which resulted in a gluey and sticky mass.

The polymer composition may be restricted by the glass transition temperature, i.e. the ability to obtain a free-flowing powder of the polymer.

Several polymers swelled and fused in liquid butane: Example 3, Example 4, Example 9, Example 11, and Example 12.

Example 14 (core-shell polymer) showed a significant particle swelling but no fusion of the powder.

Example 11 and Example 12 exhibited good swelling and fusion in liquid propane.

None of the polymers showed swelling and/or fusion in supercritical methane.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof. Additionally, the present application encompasses not only individual embodiments but also combinations of embodiments. Features disclosed with respect to one or some embodiments may also be combined with other embodiments.

The invention claimed is:

1. An at least partially crosslinked polymer comprising:
  at least one vinyl aromatic monomer selected from the group consisting of para-tertbutylstyrene, 4-tert-butoxystyrene, 4-benzhydrylstyrene, 9-vinylanthracene, and 4-vinylbiphenyl; and
  at least one (meth)acrylic monomer selected from the group consisting of isobutyl methacrylate, tert-butyl-methacrylate, and 2-ethylhexyl acrylate;
  wherein the at least one (meth)acrylic monomer comprises tert-butyl-methacrylate in an amount of at least 30 mol % of the polymer.

2. A wellbore cementing composition comprising:
  cement powder; and
  hydrocarbon swelling particles comprising the at least partially crosslinked polymer of claim 1.

3. A method for producing a cementitious wellbore sheath comprising:
  pumping a slurry into a wellbore;
  wherein the slurry comprises:
    cement;
    water; and
    hydrocarbon swelling particles comprising the at least partially crosslinked polymer of claim 1.

4. The method of claim 3, wherein the slurry further comprises:
  a polycarboxylate dispersant.

5. The method of claim 3, wherein the particles have diameters within a range of about 20 μm to about 1,000 μm.

6. The method of claim 3, wherein the particles have a 050 in a range of about 50 μm to about 300 μm.

7. An at least partially crosslinked polymer comprising:
  at least one vinyl aromatic monomer selected from the group consisting of para-tertbutylstyrene, 4-tert-butoxystyrene, 4-benzhydrylstyrene, 9-vinylanthracene, and 4-vinylbiphenyl; and
  at least one (meth)acrylic monomer selected from the group consisting of isobutyl methacrylate, tert-butyl-methacrylate, and 2-ethylhexyl acrylate;
  wherein the at least one vinyl aromatic monomer comprises para-tertbutylstyrene in an amount of at least 50 mol % of the polymer; wherein the at least one (meth) acrylic monomer comprises isobutyl methacrylate or tert-butyl-methacrylate in an amount of at least 30 mol % of the polymer; and wherein the polymer further comprises 2-ethylhexyl acrylate.

8. The at least partially crosslinked polymer of claim 7, wherein the 2-ethylhexl acrylate is in an amount of 5 mol % to 20 mol % of the polymer.

9. A wellbore cementing composition comprising cement powder; and
  hydrocarbon swelling particles comprising the at least partially crosslinked polymer of claim 7.

10. A wellbore cementing composition comprising:
  cement powder; and
  hydrocarbon swelling particles comprising the at least partially crosslinked polymer of claim 8.

11. A method for producing a cementitious wellbore sheath comprising:
  pumping a slurry into a wellbore;
  wherein the slurry comprises:
    cement;
    water; and
    hydrocarbon swelling particles comprising the at least partially crosslinked polymer of claim 7.

12. A method for producing a cementitious wellbore sheath comprising:
  pumping a slurry into a wellbore;
  wherein the slurry comprises:
    cement;
    water; and
    hydrocarbon swelling particles comprising the at least partially crosslinked polymer of claim 8.

* * * * *